United States Patent
Iu et al.

(10) Patent No.: US 6,658,059 B1
(45) Date of Patent: Dec. 2, 2003

(54) MOTION FIELD MODELING AND ESTIMATION USING MOTION TRANSFORM

(75) Inventors: Siu-Leong Iu, San Jose, CA (US); Yun-Ting Lin, Ossining, NY (US)

(73) Assignee: Digital Video Express, L.P., Herndon, VA (US)

( * ) Notice: Subject to any disclaimer, the term of this patent is extended or adjusted under 35 U.S.C. 154(b) by 0 days.

(21) Appl. No.: 09/484,038

(22) Filed: Jan. 18, 2000

Related U.S. Application Data
(60) Provisional application No. 60/116,078, filed on Jan. 15, 1999.

(51) Int. Cl.[7] .............................. H04B 1/66; H04N 7/12
(52) U.S. Cl. .................................. 375/240.16; 348/699
(58) Field of Search ........................ 375/240.16, 240.12, 375/240.19, 240.18; 348/699, 416, 413, 402, 700, 407; 382/107, 238, 250

(56) References Cited

U.S. PATENT DOCUMENTS 5,654,771 A * 8/1997 Tekalp et al. ................ 348/699
6,526,096 B2 * 2/2003 Lainema et al. ........ 375/240.16

OTHER PUBLICATIONS

W. Cai amd J. Wang. Adaptive multiresolution collocation methods for initial boundary value problems of nonlinear pdes. SIAM J. Numer. Anal., 33(3):937–970, Jun. 1996.

C.–C. Lien, C.–L. Huang, and J.–G. Chen. Complex–subband transform for subband–based motion estimation/compensation and coding. IEEE Trans. on Image Processing, 6(5):694–702, 1997.

Y.–T. Wu, T. Kanade, J. Cohen, and C.–C LI. Optical Flow Estimation Using Wavelet Motion Model. ICCV'98, 1998, pp. 992–998.

* cited by examiner

Primary Examiner—Vu Le
Assistant Examiner—Behrooz Senfi
(74) Attorney, Agent, or Firm—David G. Grossman

(57) ABSTRACT

A motion transform is implemented for calculating the motion field between two images. An optical flow calculator is configured for generating an image motion vector field by iteratively comparing a predicted image with a second image frame, the predicted image being produced based upon a first memory frame and image gradients generated according to a motion estimate that is produced according to a transform function using transform coefficients. The transform coefficients are estimated based upon a previously determined image gradient.

38 Claims, 8 Drawing Sheets

MOTION FIELD MODELING AND ESTIMATION USING MOTION TRANSFORM

The present application claims priority on co-pending commonly assigned provisional patent application Ser. No. 60/116,078, to Iu et al., filed on Jan. 15, 1999, entitled "Motion Field Modeling and Estimation Using Motion Transform", the contents of which are incorporated by reference herein.

FIELD OF THE INVENTION

The present invention relates to the field of video processing, and more particularly to motion field modeling and estimation of video content using a motion transform.

BACKGROUND OF THE INVENTION

Motion field modeling and estimation is important to computer vision and image processing. Accurate and efficient motion field estimation is meaningful for general video processing and applications, such as motion compensation coding of digital TV, noise reduction for video sequences, frame rate conversion and target tracking. Motion field estimation is also important for computer vision and human vision, such as for the recovery of 3-D motion and the structure of moving objects, and image registration.

An example of where motion field estimation is particularly useful is in MPEG video data compression. One of the main techniques to produce high compression techniques relies on accurately determining blocks of each frame that are in motion. Data describing the motion for only those blocks in the video determined to be in motion are encoded in the video stream between frames. This results in memory and bandwidth savings.

Motion fields are typically represented as motion vector fields that are a pixel-by-pixel map of image motion from one image frame to the next image frame. Each pixel in the frame has a motion vector that defines a matching pixel in the next or previous frame. The combination of these motion vectors is the motion vector field. Storage requirements for vector fields may be large. There is a need for an apparatus and method that can efficiently model and estimate a motion vector field thereby reducing the memory requirements for storing the motion vector field.

To provide a better understanding of motion vector fields, a brief review of prior art that may lead to a motion vector field follows.

FIG. 1 depicts a video frame. Each rectangle portion corresponds to a respectively different image component which is preferably a pixel or group of pixels. The pixels may be referenced by x and y values respectively. Each pixel may have a value that is preferably represented by an intensity value E(x,y,t) in the image plane at time t. The horizontal location of the pixel is represented by 'x' and is preferably numbered between 1 and a maximum value illustrated in this example as 'a'. The vertical location of the pixel is represented by 'y' and is preferably numbered between 1 and a maximum value as illustrated here as 'b'. Time is represented as 't'. The exemplary image data used by the apparatus and methods described have pixels with random values. The image is shown having contrasting central and surrounding parts for clarity in the description.

FIG. 2 illustrates how a video sequence may be made from a series of successive video frames. Each frame is shown sequentially as time 't' increases. In the present invention, motion is preferably analyzed between a series of adjacent frames.

If there is no motion between two successive frames, a motion vector field 300 such as that shown in FIG. 3 may be generated. In this motion vector field, all vector elements are zero, indicating no motion in the image.

As shown in FIG. 4A, a central area 404 moves to the position of a central area 402, as indicated by the broken-line box in a field of observation 400 between a current frame and a next frame. When a method according to the present invention is used to generate a motion vector field from the frames, one containing the area 404 and the other containing the area 402, a motion vector field such as that shown in FIG. 4B is generated. A motion vector for each pixel in the area indicates that the pixel has moved in the direction of the motion.

Although the techniques described herein could easily be applied to image components other than frames, such as image fields or portions of image frames, the description below refers only to image frames so as to avoid confusion in terminology with the fields of motion vectors.

Motion estimation is defined as finding the motion vectors $v(x)=[u(x), v(x)]^T$, $\forall x$, from one image to another, where $x=[x,y]^T$ denotes the pixel location. A constant intensity constraint $I_1(x)=I_2(v+v(x))$, $\forall x$, is based on the assumption that each pixel on one image moves to another position on the other image without changing the pixel intensity. This constant intensity constraint by itself forms an underconstrained system and therefore the motion vectors cannot be solved.

Much work has been done to find additional constraints which are suitable for modeling the true motion field. Optical flow algorithms often assume the smoothness of the motion field and occasionally deal with motion discontinuities. Active-mesh based approaches reduce the number of unknowns by tracking only a set of feature (or nodal) points based on a neighboring image structure or a mesh structure. A dense motion field may then be interpolated from the nodal points' movements.

Another category is the parametric or model-based approach which assumes that a motion field may be described by a single or multiple motion model(s) or geometric transformation(s) by using a relatively small number of parameters. Under the umbrella of parametric methods, the present invention uses a motion transform, in which the motion field is represented in the transform domain and is treated as the unknown signal to be estimated. Note that this approach is different from motion estimation using the phase-correlation method as described in a paper by J. Fleet et al. entitled "Computation of component image velocity from local phase information" Int'l J. Comput. Vis., 5:77–104, 1990 or spatio-temporal frequency domain analysis as described in a paper by C. Lien et al. entitled "Complex-subband transform for subband-based motion estimation/compensation and coding" IEEE Trans. on Image Processing, 6(5):694–702, 1997, in which the transform is performed on the image intensity field. An advantage of using a motion transform is that the motion transform may model any motion field, including motion discontinuities, provided that the full spectrum in the transform domain is considered. A motion transform offers a great generality for motion modeling since the estimated motion surface does not need to be restricted to a planar (e.g., affine) or a polynomial surface (e.g., pseudo-perspective, biquadratic, or any other second or higher-order polynomial model). Moreover, the motion transform offers the flexibility to choose/remove certain time-frequency components in order to accommodate the underlying motion field. Very often, a small number of selected transform coefficients may be effective to describe the motion or warping between frames, which may provide an economic means for motion-compensated video coding. Motion estimation results by using the DCT/DFT for motion modeling, especially DCT, due to its simplicity, efficiency, and greater flexibility are quite comparable to a wavelet-based approach proposed by Wu et al. in a paper entitled "Optical flow estimation using wavelet motion model", ICCV '98, 1998, in which a wavelet function as described in a paper by Cai et al. entitled "Adaptive multiresolution collocation methods for initial boundary value problems of nonlinear pdes" SIAM J. Numer. Anal., 33(3):937–970, June 1996 is adopted to model the motion field.

SUMMARY AND ADVANTAGES OF THE INVENTION

One advantage of the invention is in more accurately and efficiently processing consecutive video frames to determine the motion of objects in video frames and output a representation of that motion as an image motion vector field, wherein each component of the image vector field represents a pixel or group of pixels of a frame.

Another advantage of this invention is that it can model any motion field including motion discontinuities.

Yet a further advantage of this invention is that it offers the flexibility of dynamically choosing the significant time-frequency components used to model the underlying motion.

To achieve the foregoing and other advantages, in accordance with all of the invention as embodied and broadly described herein, an apparatus for generating an image motion vector field which describes a motion of individual image components of a first image frame and corresponding image components of a second image frame in a sequence of image frames, the apparatus comprising a first frame memory for receiving said first image frame; a second frame memory for receiving a second image frame; and an optical flow calculator configured for generating an image motion vector field by iteratively comparing a predicted image with the second image frame, the predicted image being produced based upon said first memory frame and image gradients generated according to a motion estimate that is produced according to a transform function using transform coefficients. The estimated transform coefficients are estimated based upon a previously determined image gradient.

In yet a further aspect of the invention, the optical flow calculator further includes a coefficient estimator configured to generate the estimated transform coefficients by solving a linear coefficient equation using the image gradients and a plurality of individual image components, wherein the transform coefficients are unknown values in the coefficient equation.

In yet a further aspect of the invention, the optical flow calculator further includes a motion estimator configured to generate a motion estimate from the transform coefficients using an inverse transform equation.

In yet a further aspect of the invention, the optical flow calculator further includes a coefficient updater configured to generate image gradients from the motion estimates.

In a further aspect of the invention, a method for generating an image motion vector field comprising the steps of receiving a first image frame having individual image components; receiving a second image frame having corresponding image components; initializing an image gradient; and generating the image motion vector field. The step of generating the image motion field further comprises iteratively: estimating transform coefficients from the individual image components and the image gradient according to a transform coefficient function; calculating a motion field according to the estimated transform coefficients; calculating image gradients according to the motion field; generating a predicted image frame according to the image gradients and the first memory frame; calculating a residual error by taking a difference between the predicted image and the second image frame; determining if the residual error is less than a predetermined threshold, and accordingly if the predicted image has converged. If the image has converged, then ending the iterations; and outputting the image motion vector field.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
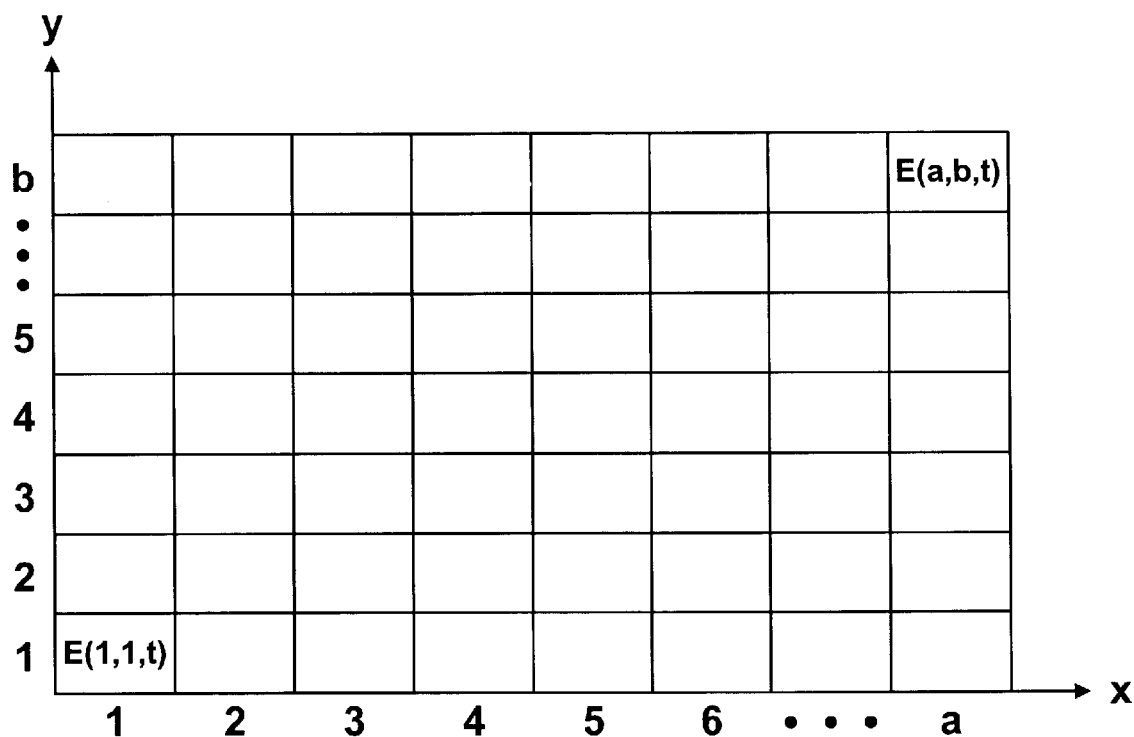
FIG. 1 is a drawing of an input video frame.
Figure 2:
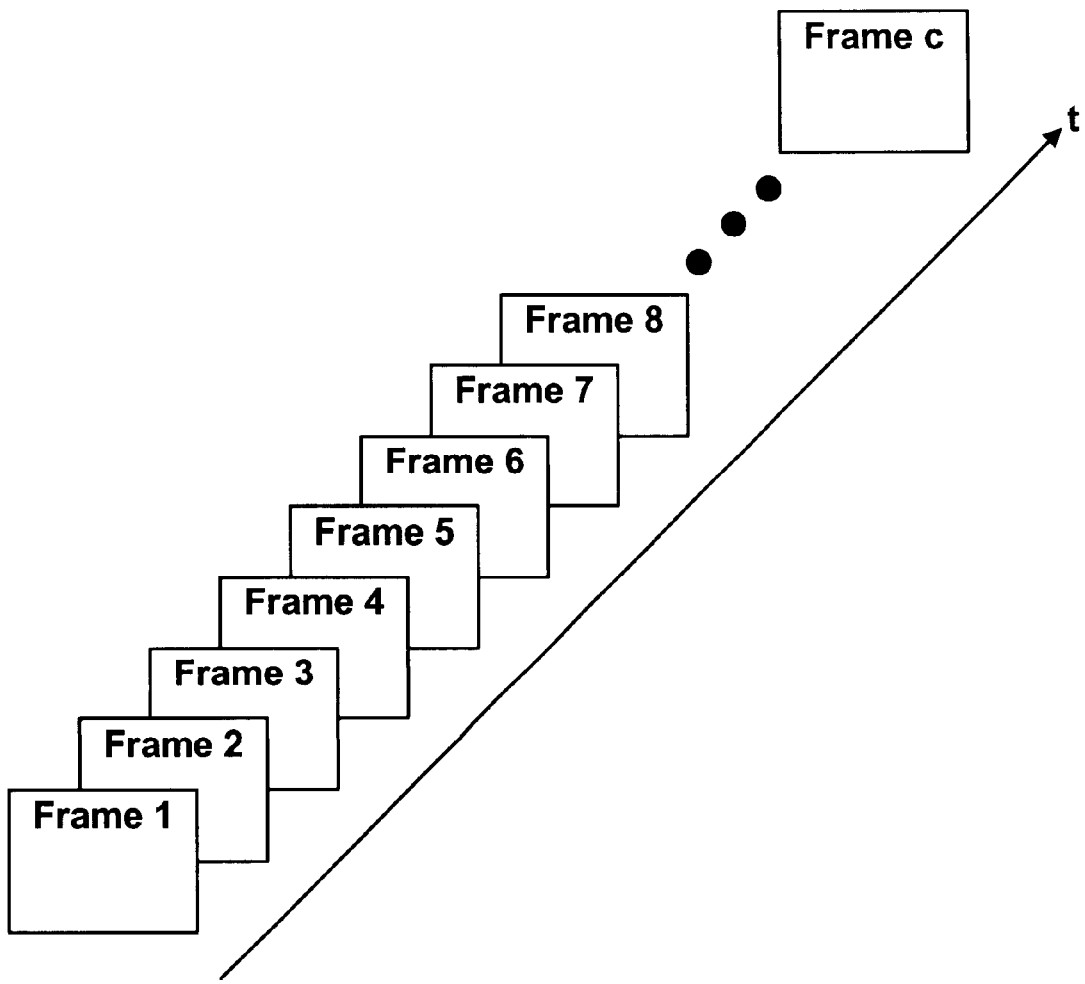
FIG. 2 is a drawing of a video sequence.
Figure 3:
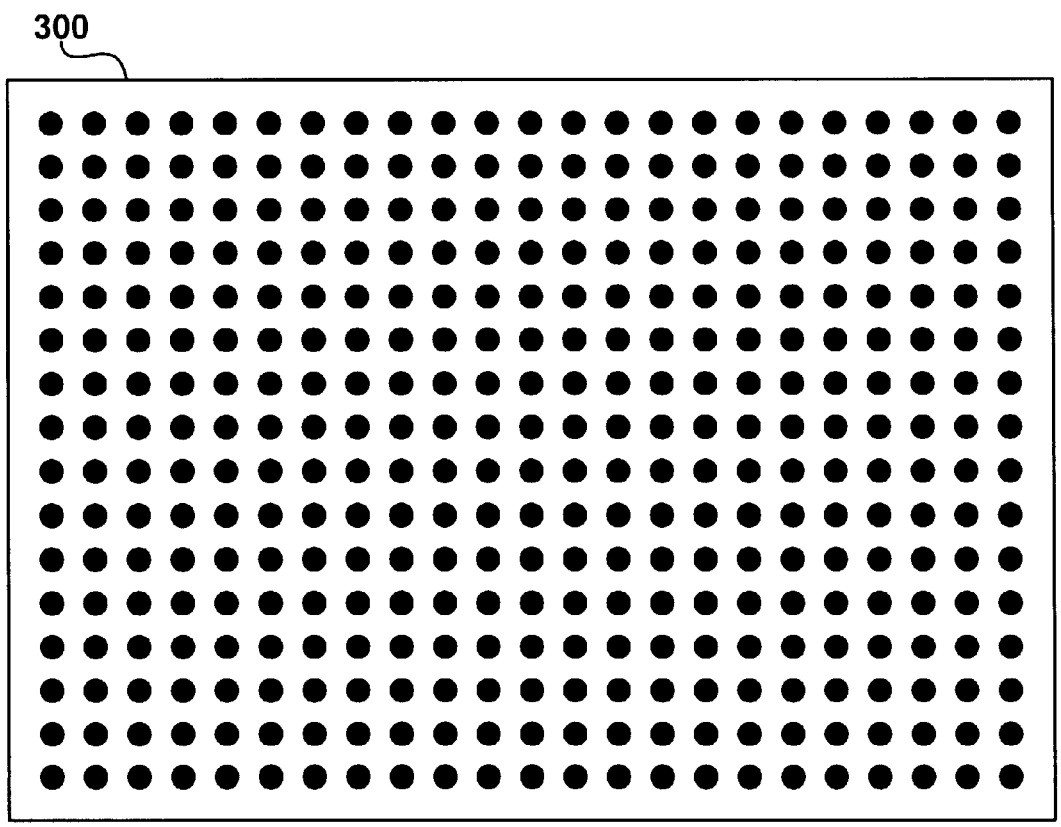
FIG. 3 is a drawing of a motion vector field.
Figure 4A:
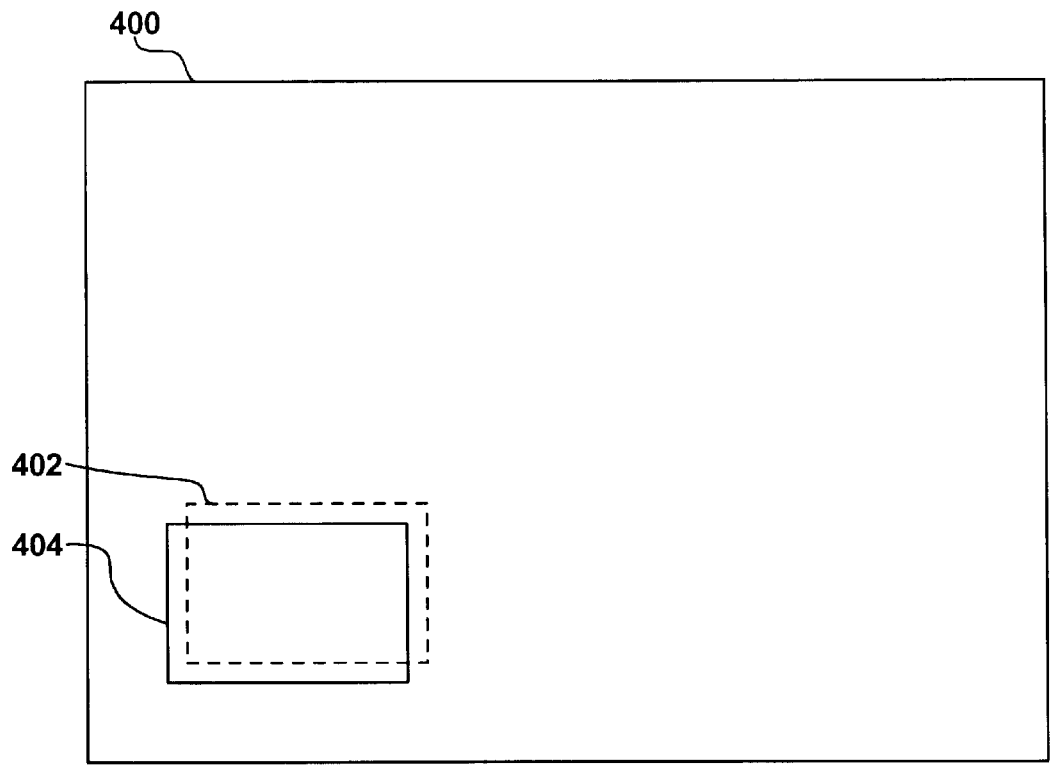
FIG. 4A is a drawing of a moving component in two consecutive input video frames.
Figure 4B:
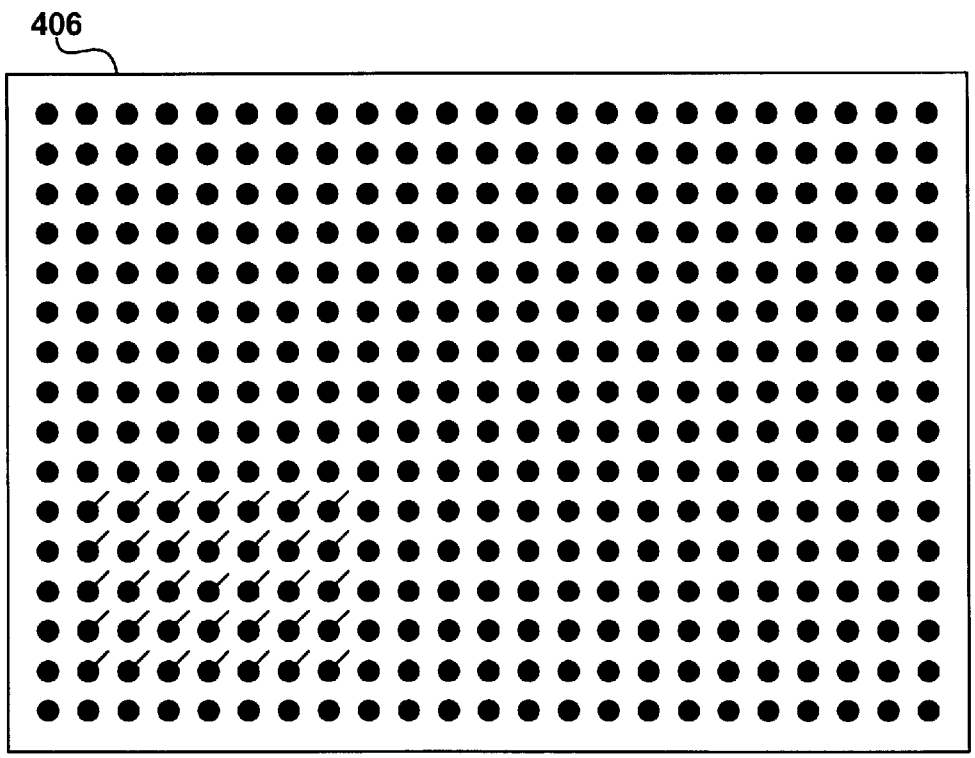
FIG. 4B is a drawing of a motion vector field produced using an embodiment of the present invention.

A motion transform is a representation for modeling the motion field in the transform domain. Compared to other parametric motion models (e.g., affine, projective, etc.), a motion transform offers a considerable advantage by its capability to model any motion field, including multiple object motions, large motions or motion discontinuities. This approach may also allow the flexibility to adaptively choose the set of coefficients to fit a particular motion field. A motion transform may also offer the flexibility of dynamically choosing the significant time-frequency components used to model the underlying motion.

The following is a mathematical derivation of an exemplary method, according to the present invention, for generating data values representing a motion vector field from other data values representing individual picture elements (pixels) of two or more images.

Motion Estimation Using Motion Transform

A motion transform represents the motion vectors $v(x) = [u(x), v(x)]^T$ in the transform domain. This transform may be the DCT (Discrete Cosine Transform), the DFT (Discrete Fourier Transform), the Haar transform, the KL transform, the wavelet transform, or many others. Let $\phi(k,x)$ denote the value of the k-th basis function at pixel x, and $M_x(k)$ and $M_y(k)$ denote the coefficients of the k-th basis function for the horizontal and vertical motion component, respectively. Note that for 2D images, these 2D basis functions may always be sequentially ordered and indexed by k. Consider N basis functions; then the motion field may be written as $$u(x) = \sum_{k=0}^{N-1} M_x(k)\phi(k,x) \text{ and } v(x) = \sum_{k=0}^{N-1} M_y(k)\phi(k,x) \quad (1)$$

or in a matrix form $v(x)=M_N\phi_N(x)$ where $$M_N = \begin{bmatrix} M_x(0) M_x(1) \ldots M_x(N-1) \\ M_y(0) M_y(1) \ldots M_y(N-1) \end{bmatrix} = \begin{bmatrix} M_{Nx} \\ M_{Ny} \end{bmatrix} \quad (2)$$

$$\Phi_N(x) = [\phi(0,x)\phi(1,x) \ldots \phi(N-1,x)]^T$$

Coefficient Estimation

Using a motion transform, the next step is to estimate the transform coefficients in $M_N$. There are many possible ways to estimate these coefficients. In the illustrated embodiment of the present invention, we take a gradient-based approach for its simplicity and efficiency. However, one skilled in the art will recognize that other estimation methods are possible. First assume the image intensity remains constant.

$$I_1(x) - I_2(x+v(x)) = 0 \forall x \quad (3)$$

Approximate $I_2(x+v)$ in Eq. 3 by its Taylor's series expansion up to the first-order terms. We have $$I_2(x+v) \approx I_2(x) + u(x)\frac{\partial I_2}{\partial x}\bigg|_x + v(x)\frac{\partial I_2}{\partial y}\bigg|_x \quad (4)$$

$$I_2(x+v) \approx I_2(x) + u(x)I_x(x) + v(x)I_y(x)$$

Where $$I_x(x) \equiv \frac{\partial I_2}{\partial x}\bigg|_x \text{ and } I_y(x) \equiv \frac{\partial I_2}{\partial y}\bigg|_x \quad (5)$$

are the horizontal and vertical image gradient, respectively.

Substitute Eq. 4 into Eq. 3 to yield $$\begin{aligned} y(x) &\equiv I_1(x) - I_2(x) \quad (6) \\ &= u(x)I_x(x) + v(x)I_y(x) \\ &= [I_x(x) \ I_y(x)]\begin{bmatrix} u(x) \\ v(x) \end{bmatrix} \\ &= [I_x(x) \ I_y(x)]v(x) \\ &= [I_x(x) \ I_y(x)]M_N(x)\Phi_N(x) \end{aligned}$$

Re-arrange the matrices so that $y(x)$ may be rewritten as:

$$\begin{aligned} y(x) &= [I_x(x)[\Phi_N(x)] I_y(x)[\Phi_N(x)]][M_x(0)M_x(1)\ldots \quad (7) \\ & M_x(N-1)M_y(0)M_y(1)\ldots M_y(N-1)]^T \\ &= [I_x(x)[\Phi_N(x)] I_y(x)[\Phi_N(x)]][M_{Nx} \ M_{Ny}]^T \end{aligned}$$

Considering all pixels leads to the following system equation:

$$Y = \begin{bmatrix} y(x_1) \\ y(x_2) \\ \vdots \\ y(x_n) \end{bmatrix} = \begin{bmatrix} I_x(x_1)[\Phi_N(x_1)] & I_y(x_1)[\Phi_N(x_1)] \\ I_x(x_2)[\Phi_N(x_2)] & I_y(x_2)[\Phi_N(x_2)] \\ \vdots & \vdots \\ I_x(x_n)[\Phi_N(x_n)] & I_y(x_n)[\Phi_N(x_n)] \end{bmatrix} [M_{Nx} \ M_{Ny}]^T \quad (8)$$

$$= D_N M'_N$$

where $M'_N = [M_{Nx} \ M_{Ny}]^T$ is a $2N\times 1$ vector containing all the unknowns. Eq. 8 may be written as a set of linear equations $(D_N^T D_N) M'_N = (D_N^T Y)$ or $A M'_N = b$ with $A = D_N^T D_N$ and $b = D_N^T Y$.

Instead of finding the least square solution for $M'_N$, we apply the Levenberg-Marquardt algorithm [Numerical], to satisfy the constraint in Eq. 3. The least square solution for $M'_N$ is therefore $$\begin{aligned} M'_N &= (D_N^T D_N)^{-1}(D_N^T) \quad (9) \\ &= Ab \end{aligned}$$

where $$A = D_N^T D_N$$
$$b = D_N^T Y \quad (10)$$

The optimization process may be iteratively applied. Each time the system equations are updated based on the current motion estimates, denoted by $\hat{v}$.

$$\begin{aligned} y(x,\hat{v}) &= I_1(x) - I_2(x+\hat{v}) \quad (11) \\ &= \Delta u(x)I_x(x+\hat{v}) + \Delta v(x)I_y(x+\hat{v}) \\ &= [I_x(x+\hat{v}) \ I_y(x+\hat{v})]\Delta v(x) \\ &= [I_x(x+\hat{v}) \ I_y(x+\hat{v})]\Delta M_N(x)\Phi_N(x) \end{aligned}$$

where $$\begin{aligned} \Delta v &= [\Delta u(x) \ \Delta v(x)] \\ &= \Delta M_N(x)\Phi_N(x) \end{aligned}$$

is the motion vector update. Note that $I_x$ and $I_y$ in Eq. 11 are evaluated at $x+v$, where $\hat{v}$ denotes the current motion estimates. Eq. 8 therefore becomes $$Y(\hat{v}) = D_N(\hat{v})\Delta M'_N$$

The updated incremental change of the coefficients (i.e. $\Delta M'_N$) may then be used to update $\hat{v}$. This process may proceed iteratively:

$$\hat{v}^{(j+1)} = \hat{v}^{(j)} + \Delta M_N^{(j)}\phi_N$$

where j is the iteration number.

Motion Estimation Using DCT

Similar to transform coding in which the intensity is represented in the transform domain, the idea behind DCT-based motion estimation is to represent the motion field in terms of its DCT coefficients. Unlike the role of image intensity in transform coding, however, the motion field is not directly observable. It has to be inferred from the intensity map as in any other motion estimation algorithm.

The advantage of wavelets is their locality property in both the spatial and frequency domain. However, exactly like in image coding, no one can give a complete proof for wavelet's superiority over DCT, which has been used in many image video coding standards such as JPEG and MPEG. We have also studied the motion estimation performance by using DCT due to its simplicity and flexibility.

Assuming an image of size X×Y, (both X and Y are a power of 2) the horizontal and vertical motion vectors are decomposed into a series of cosine waves:

$$u(x, y) = \sum_{k_1=0}^{K-1} \sum_{k_2=0}^{K-1} c_{k_1,k_2} \cos\left(\pi k_1 \frac{x+0.5}{X}\right) \cos\left(\pi k_2 \frac{y+0.5}{Y}\right) \quad (12)$$

$$v(x, y) = \sum_{k_1=0}^{K-1} \sum_{k_2=0}^{K-1} d_{k_1,k_2} \cos\left(\pi k_1 \frac{x+0.5}{X}\right) \cos\left(\pi k_2 \frac{y+0.5}{Y}\right)$$

where K−1 is the index of the highest frequency component for each direction. The required number of frequency components may be adaptively decided depending on the spatial frequency of the underlying motion field. Note that Eq. 12 may be written in the same form as Eq. 1 by imposing a sequential order indexed by k (for k=0, . . . , N−1; then N=K$^2$ in Eq. 1) on the coefficients $M_{Nx}(k)=c_{k_1,k_2}$, $M_{Ny}(k)=d_{k_1,k_2}$, and the corresponding basis functions $$\phi(k, x) = \cos\left(\pi k_1 \frac{x+0.5}{X}\right) \cos\left(\pi k_2 \frac{y+0.5}{Y}\right).$$

One straightforward ordering is k=$k_1$*K+$k_2$, for $k_1$=0, . . . , K−1, and $k_2$=0, . . . , K−1.

Choice of Coefficients and Computation Reduction

The choice of total number of coefficients has to be traded off against robustness and computation cost. Theoretically, by including more coefficients, motion vectors may be modeled with greater accuracy. The extreme case is to have the number of coefficients equal to the number of pixels so that the true motion field maps to one unique set of coefficients. However, when more coefficients are included, the algorithm becomes less robust due to the expansion of the solution space. Another disadvantage of using too many coefficients is that the computation cost may increase significantly mainly due to the increased size of A and b. In practice, it is important to keep the number of coefficients small while at the same time producing good motion estimates. For this purpose, embodiments of the present invention may use the following schemes to handle the selection of coefficients.

Zig-Zag Scanning Order

Figure 8:
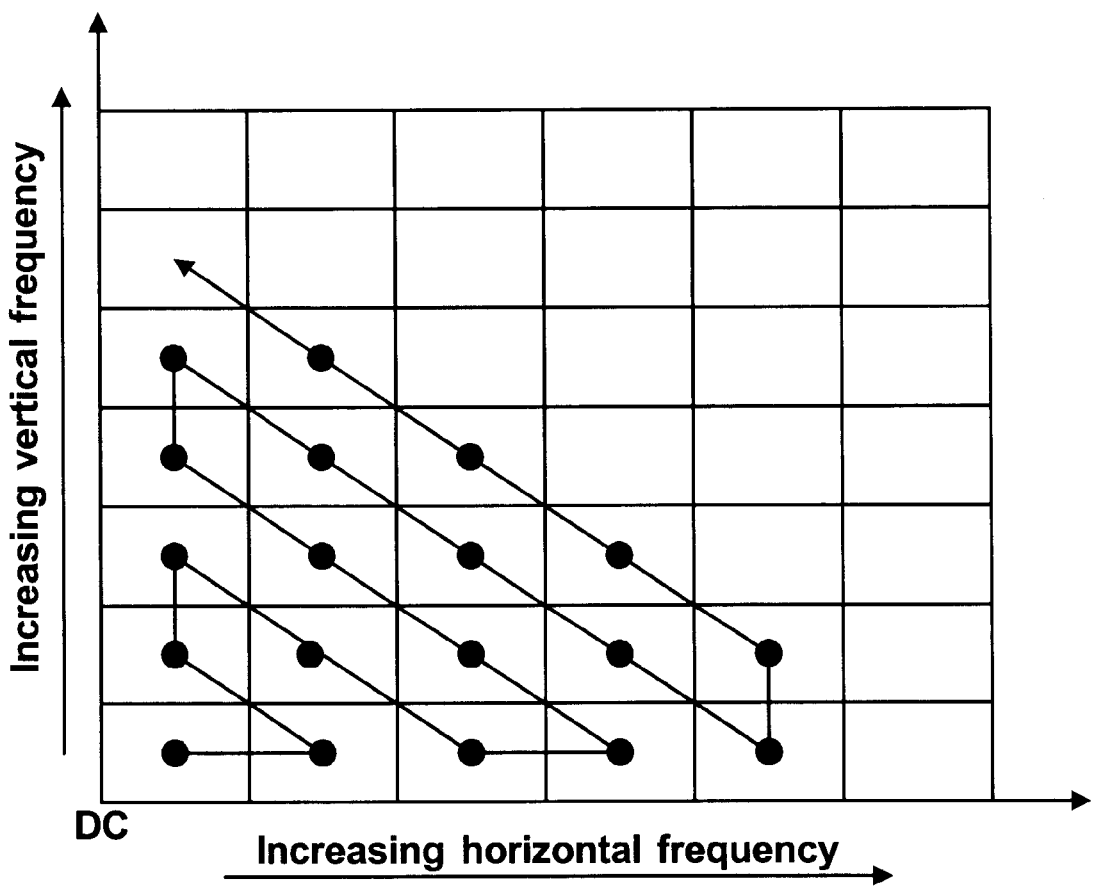
FIG. 8 is a drawing showing how an embodiment of the invention may perform a zig-zag scan.

Normally, in the frequency domain of the motion field, the energy tends to concentrate on the low frequency bands. For the same reason that JPEG/MPEG uses a zig-zag scan of DCT coefficients, the present invention may impose a zig-zag sequential ordering to these coefficients for motion modeling as illustarted in FIG. 8.

Adding New Coefficients

The iteration process may start from a small number of coefficients. New coefficients may then gradually added into the iterative process. When the number of coefficients increases from $N_1$ to $N_2$ ($N_1$<$N_2$), $M_{N_1}$ retains its previous values while newly added coefficients are initialized to zero.

In the DCT-based approach, the choice of the number of coefficients is quite flexible since all N∈Z, 0≦N≦X·Y are permissible. For example, the present invention could start with 16 DCT coefficients. Each time when the current coefficient set converges, the next 16 coefficients in the zig-zag order may be added to M, until the preset maximum number of coefficients are reached.

Adaptive Coefficient Removal

Coefficients with their magnitude smaller than a threshold $T_c$ may be discarded adaptively during the iterative process. This treatment effectively reduces the size of D and M'.

The computation cost is also directly affected by the number of pixels we consider in D and Y. In order to reduce these matrices' sizes, the following schemes may be embedded into the system.

Thresholding on Gradient Magnitude

Examining Eq. 8, observe that pixels with zero or small image gradients have no or little effect on the solution. In the present embodiment of the invention, pixels with small image gradients may be excluded using a criterion which discards x if $\|g(x)\|^2 = I_x^2(x) + I_y^2(x) < T_g$ where $T_g$=min(0.1$\hat{g}$, $g_{max}$) and $$\bar{g} = \frac{1}{XY} \Sigma_x \|g(x)\|^2.$$

Therefore, for images with relatively lower contrast, a smaller gradient threshold may be used. Note that since the estimation method is gradient-based, uniform regions with small intensity gradients may not have much influence on the motion estimates.

Thresholding on Residual Difference

By thresholding the residual difference, a pixel x may be excluded from the matrix Y if y(x)≦$T_e$. This treatment may effectively reduce the computation cost without compromising much on the quality of the solution.

Pixel Sub-sampling

One simple way to greatly decimate the size of Y is to apply pixel sub-sampling so that the motion estimates are only based on sub-sampled images. A parameter step may be defined to control the subsampling rate.

Multi-resolution of Images

A multi-resolution (coarse to fine) approach in which different low pass filtered versions of the images are extracted may also be used. The algorithm starts by finding the motion field at the coarsest resolution using a small number of coefficients, with a larger pixel sub-sampling step. The number of coefficients may gradually increase when the resolution becomes finer. It may be critical that at coarser resolution a smoother gradient field is present. Low-pass filtering based on expanding the Gaussian pyramids to the same size as the original images may be used.

Look-up Tables

Look-up tables (LUT) may also be used to save the basis functions at fixed sampling points for a faster implementation. The value of basis functions ($\phi, \Psi^H, \Psi^V$, and $\Psi^D$) at fixed sampling points (depending on the image size and L) may be pre-calculated and stored in the LUTs for fast retrieval since they are repeatedly referenced during each iteration. For example, if L=4 is used for an image of size 256×256, the support of the wavelet function [0,4]×[0,4] is partitioned into 256×256 grids and the function values at the grid points may be pre-calculated and stored in look-up tables. Reference to the LUTs at different resolution level is simply sub-sampling of the grids.

Global Motion Estimation (e.g., DC Terms)

In some cases when there is a global motion being applied to the entire frame, it may be more efficient to estimate this global motion first, and then use wavelet coefficients to model small local variations. For example, if a global translation exists, instead of estimating u and v, $\bar{u}$ and $\bar{v}$ may be estimated first and then $u-\hat{u}$ and $v-\hat{v}$ may be estimated where $\hat{u}$ and $\hat{v}$ are the estimate of the average (or DC terms) of the signal. The Levenberg-Marquardt method may be used for finding the DC terms, which is a combined gradient and Hessian method. This treatment is particularly useful when the warping between two images may be described by a simple global translation. Faster convergence may be achieved and sometimes there is no need to even estimate the wavelet coefficients if the global motion model has already captured the warping function. For an arbitrary motion, this scheme may provide a slightly faster convergence.

Image Partitioning

Motion estimation using wavelets on a sub-image of quarter size may take much less than a quarter of the processing time needed for registering the entire image. The image may be partitioned into smaller sub-images and results then combined together. To avoid suffering the performance at the sub-image boundary, overlapping sub-images may be used so that motion vectors at the boundary region may be properly interpolated.

Pre-calculate Residual Errors

Residual errors may be pre-calculated within a pre-defined search range for every pixel. To reduce the computation overhead from a full-search, a hierarchical sub-sampling scheme (e.g. 3-step search of block-matching algorithm used for motion estimation in MPEG) may be adopted.

FIGS. 5, 6 & 7

Figure 5:
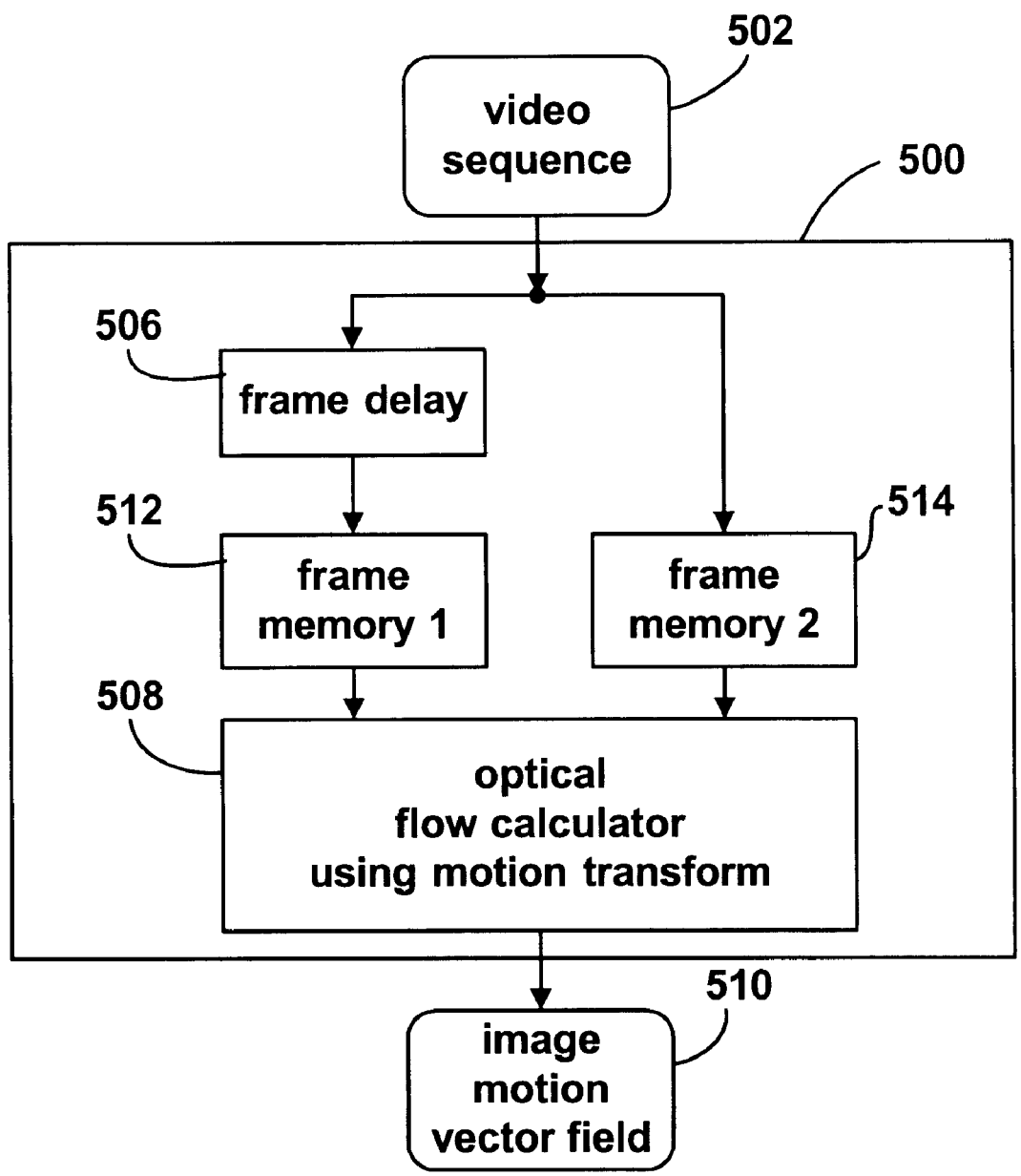
FIG. 5 is a block diagram of a motion vector field generator.

FIG. 5 is a block diagram of a motion detection apparatus 500 which may be used to generate motion vector fields in accordance with the present invention. This apparatus 500 preferably accepts a video sequence 502 as input. The video sequence 502 takes two separate routes. A first route preferably takes the video sequence 502 through a frame delay device 506 to a first frame memory 512. A second route preferably takes the video sequence to a second frame memory 514. The first memory frame 512 and the second frame memory 514 provide their respective frames to an optical flow calculator that 508. The optical flow calculator 508 then preferably processes a pair of images from the video sequence 502 as previously described and outputs an image motion vector field 510, which describes any motion that may have occurred between the frames.

Although the motion detection apparatus 500 is shown as receiving two frames of data, it is contemplated that, in a steady state operation, only one new frame of data may be applied to the apparatus 500 at any given time. Data located in frame memory 514 may simply be moved to delayed frame memory 512 thereby becoming the first frame when the frame memories are moved to the optical flow calculator.

Figure 6:
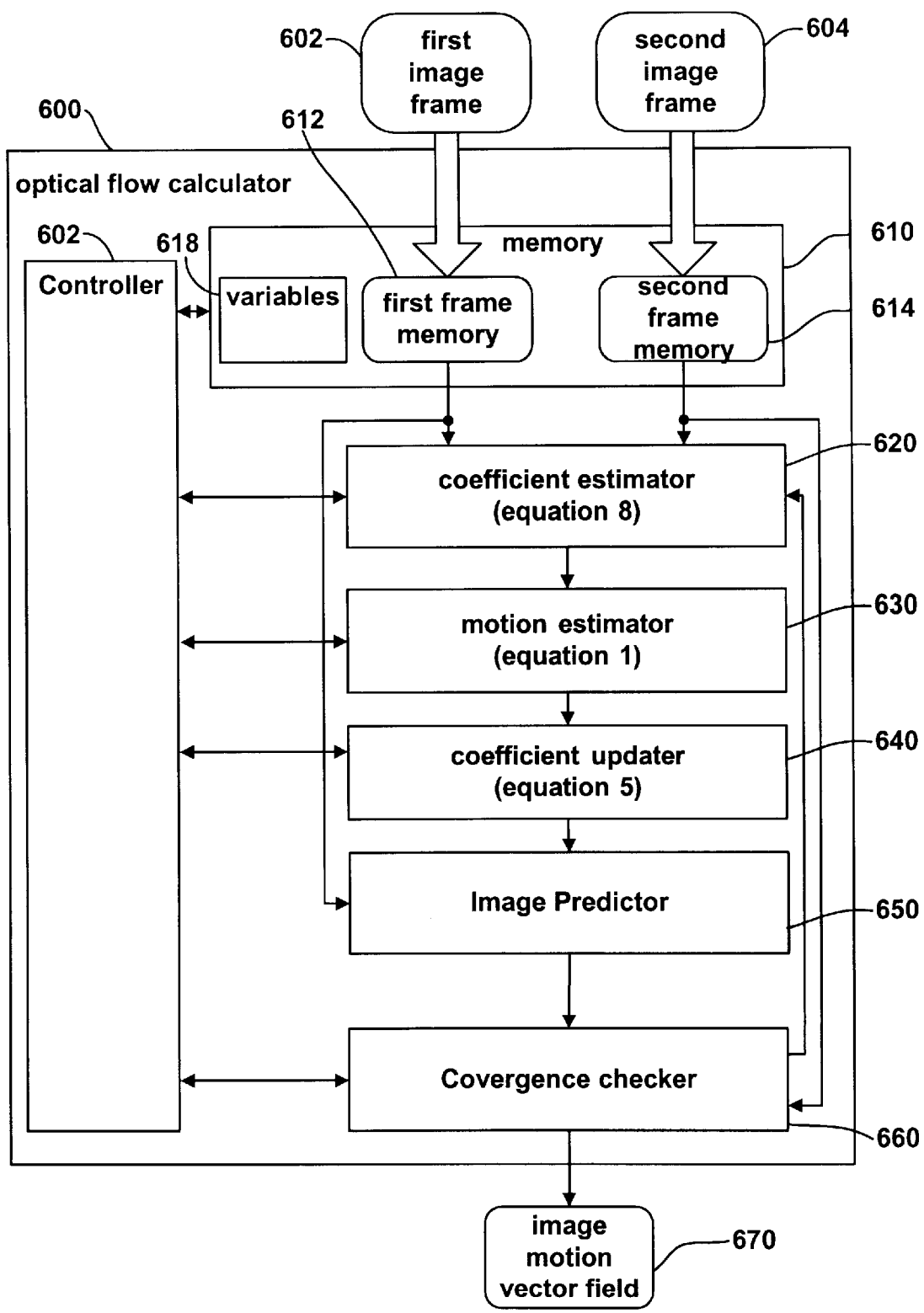
FIG. 6 is a block diagram of an aspect of the present invention which performs a vector motion field transform.

As described above, FIG. 6 is a block diagram of an optical flow calculator 600 in accordance with the present invention. The optical flow calculator 600 generates an image motion vector field 660 by iteratively generating a predicted image according to a transform function using estimated transform coefficients. The estimated transform coefficients are estimated according to a previous motion estimate, whereby improving said transform coefficients. Each iteration, the predicted image is compared with the second image frame to determine if the coefficients have converged. Once the coefficients have converged, the coefficients in conjunction with the transform function form a motion model which may estimate an image motion vector field.

In the presently illustrated embodiment of the invention, the optical flow calculator 600 includes a controller 602, a memory 610, a coefficient estimator 620, an motion estimator 630, a coefficient updater 640, an image predictor 650 and a convergence checker 660. Each of these elements work together to generate the image motion vector field 670 from a first image frame 602 a the second image frame 604.

The memory 610 includes a first frame memory 612 which preferably accepts as input the first image frame 602, and a second frame memory 614 which preferably accepts as input the second image frame 604. The memory 610 may also include locations to hold variables such as iteration counts, thresholds values, and current estimates for use in assisting the controller 602 in controlling the operation of the optical flow calculator 600. The image frames contained in the first frame memory 612 and the second frame memory 614 are made up of a plurality of image components, each image component represented by an intensity value. Each image component may be a pixel or group of pixels.

The optical flow calculator 600 controller may initialize several variables at the beginning of each image component calculation including the iteration count, the initial motion estimate, and the transform coefficients.

The coefficient estimator 620 inputs intensity values from the first and second frame memories to determine in conjunction with the previous motion estimate transform coefficients. The previous discussion of equation 8 describes this calculation.

The coefficient estimates output from the coefficient estimator is inputted to the motion estimator 630 which calculates the adjusted velocity ($\Delta u$ and $\Delta v$) for the iteration as described by equation 1. Next, the coefficient estimates are updated by the coefficient updater 640. The coefficient updater is configured to generates image gradients according to equation 5. The coefficient updater may also make determinations as to whether coefficients should be adaptively added or excluded for further calculations. The output of the coefficient updater 640 is input to the image predictor 650 which will create a predicted image around the point of interest based on the first frame memory and the predicted motion vector using motion compensation. The convergence checker 660 will then compare this image with the values stored in the second frame memory 614 and determine if the error is below a predetermined threshold value. When the image converges the convergence detector 660 informs the controller that the estimation is complete, and the calculated image motion vectors are output to the image motion vector field 670.

Figure 7:
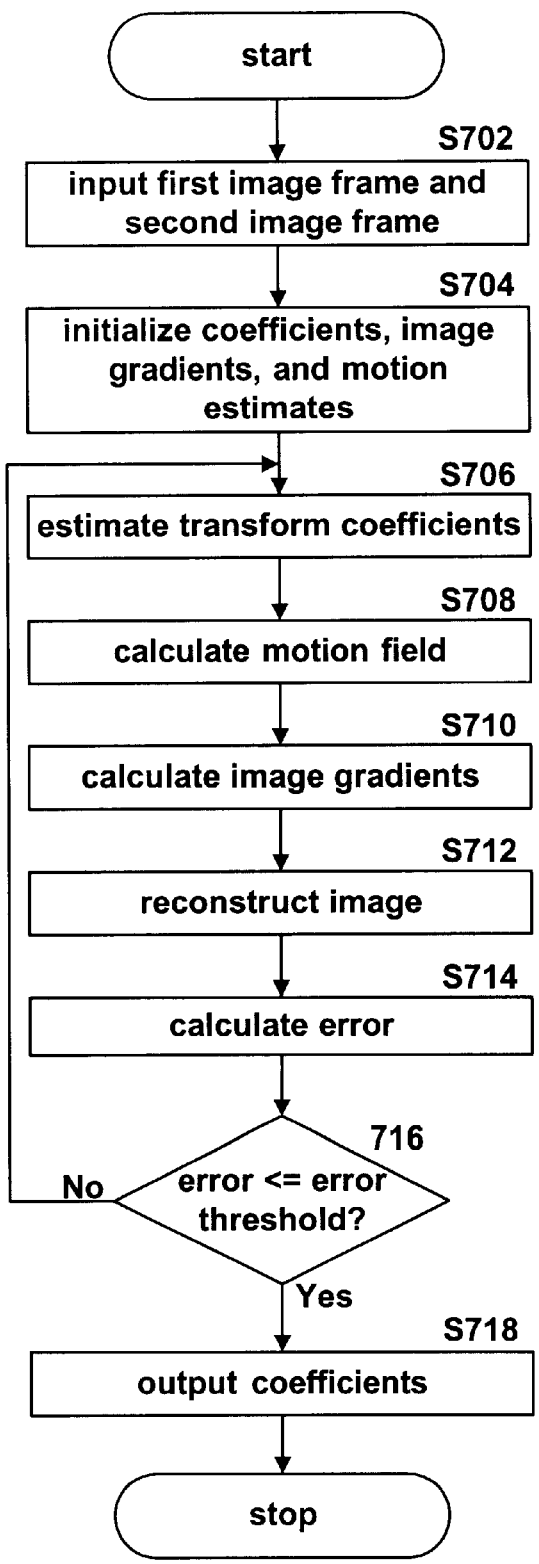
FIG. 7 is a flow diagram of an aspect of the present invention which performs a vector motion field transform.

FIG. 7 is a flow-chart diagram which illustrates the operation of the optical flow calculator 508 in an exemplary embodiment of the invention. The process begins at step S702 where the first and second image frame are input to the optical flow calculator 508. The first image frame is preferably delayed such that the second frame represents a frame from video sequence 502 that is later in time than the first frame by delta time T. As per the illustrated embodiment of the present invention, transform coefficients, image gradients, and motion estimates are initialized at step S704. At step S706, estimates of transform coefficients are made according to equation 8, which was previously described. The estimated transform coefficients are then used at step S708 to calculate a motion field according to equation 1, which was previously described. The estimated motion field is then used to calculate image gradients at step S710 according to equation 5, which was previously described. Step S712 generates a predicted image based on the first image frame and the current motion estimate. At step S714, a determination of whether the current motion estimate has converged by comparing the predicted image is compared with the second image frame 604. The determination is positive if the residual value (the difference between the predicted image and the second image frame 604) is less than a predetermined threshold value. If the determination at step S716 is negative, then processing proceeds back to step S706 for another iteration. If the determination at step S716 is positive, then processing proceeds to step S718 where the present estimate may be used as the image vector field. Optionally, the transform coefficients may also be output at this step.

Although the present invention has been fully described by way of examples with reference to the accompanying drawings, it is to be noted that various changes and modifications will be apparent to those skilled in the art. For example, it will be apparent to those of skill in the art that the method and apparatus for estimating motion of the present invention may be modified for use in conjunction with other video processing systems. Therefore, it is contemplated that it may be practiced as outlined above with modifications within the spirit and scope of the claims.

We claim:

1. An apparatus for generating an image motion vector field which describes a motion of individual image components of a first image frame and corresponding image components of a second image frame in a sequence of image frames, the apparatus comprising:
   (a) a first frame memory for receiving said first image frame;
   (b) a second frame memory for receiving a second image frame; and
   (c) an optical flow calculator configured for generating an image motion vector field by iteratively comparing a predicted image with said second image frame, said predicted image being produced based upon said first memory frame and image gradients generated according to a motion estimate that is produced according to a transform function using estimate transform coefficients, wherein said estimated transform coefficients, estimated based upon a previously determined image gradient.

2. The apparatus according to claim 1, wherein said optical flow calculator is further configured to initialize said image gradients.

3. The apparatus according to claim 1, wherein each image component is a pixel.

4. The apparatus according to claim 1, wherein each image component includes a plurality of pixels.

5. The apparatus according to claim 1, wherein said optical flow calculator further includes a coefficient estimator configured to generate said estimated transform coefficients by solving a linear coefficient equation using said image gradients and a plurality of individual image components, wherein said transform coefficients are unknown values in said coefficient equation.

6. The apparatus according to claim 1, wherein said optical flow calculator further includes a motion estimator configured to generate a motion estimate from said transform coefficients using an inverse transform equation.

7. The apparatus according to claim 1, wherein said optical flow calculator further includes a coefficient updater configured to generate image gradients from said motion estimates.

8. The apparatus according to claim 1, wherein said optical flow calculator further includes an image predictor configured to generate a predicted image from said image gradients and said first memory frame.

9. The apparatus according to claim 1, wherein said optical flow calculator further includes a convergence checker configured to determine if said estimated transform coefficients have converged by:
   (a) calculating a residual error by taking a difference between said predicted image and said second image frame; and
   (b) determining if said residual error is less than a predetermined threshold.

10. The apparatus according to claim 1, wherein said optical flow calculator is configured to impose a zig-zag sequential ordering of said estimated transform coefficients.

11. The apparatus according to claim 1, wherein said optical flow calculator is configured to gradually add coefficients during an iterative process.

12. The apparatus according to claim 11, wherein said optical flow calculator is further configured to initialize said added coefficients.

13. The apparatus according to claim 1, wherein said optical flow calculator is configured to discard a coefficient adaptively during iterative comparing if an incremental change between a current estimated coefficient value and a previous estimated coefficient value has a magnitude smaller than a threshold value, such that the current estimated coefficient value attains a final coefficient value.

14. The apparatus according to claim 1, wherein said image motion vector field comprises a plurality of motion vectors whose values approximate the movement of corresponding image components between said first image frame and second first image frame.

15. The apparatus according to claim 1, wherein said optical flow calculator is configured to exclude image gradients whose value is less than a threshold value.

16. The apparatus according to claim 1, wherein said optical flow calculator is configured to sub-sample prescribed values including individual image component values, image gradient values, and residual error values.

17. The apparatus according to claim 16, wherein said optical flow calculator is configured to increase the resolution of said sub-sampling during the iterative comparing, wherein during early iterations fewer transform coefficients are used and fewer prescribed values are sub-sampled, and during later iterations greater coefficients are used and greater prescribed values are sub-sampled.

18. The apparatus according to claim 1, wherein said optical flow calculator is configured to partition a motion field into a plurality of smaller motion fields creating a plurality of reconstructed images, and create a reconstructed image by combining said reconstructed images.

19. The apparatus according to claim 18, wherein said reconstructed images overlap.

20. The apparatus according to claim 1, wherein said optical flow calculator is further configured to calculate transform coefficients for at least one of the following:
   (a) a discrete cosine transform;
   (b) a discrete fourier transform;
   (c) a Haar transform;
   (d) a KL transform; and
   (e) a wavelet transform.

21. The apparatus according to claim 5, wherein said coefficient estimator further includes a lookup table to save basis function values at fixed sampling points.

22. The apparatus according to claim 1, wherein said optical flow calculator further includes a global motion estimator, wherein said global motion estimator generates a global estimate and said optical flow calculator models only motion differences between said global estimate and a reference motion field.

23. A method for generating an image motion vector field comprising the steps of:
   (a) receiving a first image frame having individual image components;
   (b) receiving a second image frame having corresponding image components;
   (c) initializing an image gradient;
   (d) generating said image motion vector field by iteratively:
      (i) estimating transform coefficients from said individual image components and said image gradient according to a transform coefficient function;
      (ii) calculating a motion field according to said estimated transform coefficients;
      (iii) calculating image gradients according to said motion field;
      (iv) generating a predicted image frame according to said motion field and first image frame;
      (v) calculating a residual error by taking a difference between said predicted image and said second image frame;
      (vi) determining if said residual error is less than a predetermined threshold, and accordingly if said predicted image has converged;
      (vii) if said predicted image has converged, ending said iterations; and
   (e) outputting said image motion vector field.

24. The method according to claim 23, wherein each image component has an intensity value of an individual picture element and wherein said step of generating an image motion vector incorporates said intensity value.

25. The method according to claim 23, wherein each image component includes a plurality of intensity values of individual picture elements and wherein said step of estimating motion uses said intensity values.

26. The method according to claim 23, wherein said transform coefficient function comprises a linear coefficient equation, wherein said individual image components and said image gradients are the known values and said transform coefficients the unknown values in said coefficient equation.

27. The method according to claim 23, wherein said step of calculating a motion field according to said estimated transform coefficients comprises the step of generating said motion field from said estimated transform coefficients using an inverse transform equation.

28. The method according to claim 23, wherein said estimated transform coefficients have a zig-zag sequential order.

29. The method according to claim 23, wherein said step of generating said image motion vector field further includes the steps of:
   (a) gradually adding transform coefficients; and
   (b) initializing said added transform coefficients.

30. The method according to claim 23, wherein said step of generating said image motion vector field further includes the step of discarding a coefficient adaptively if the incremental change between said current estimated coefficient value and said previous estimated coefficient value has a magnitude smaller than a predetermined threshold value, thereby making the current estimated coefficient value a final coefficient value.

31. The method according to claim 23, wherein said image motion vector field comprises a plurality of motion vectors whose values approximate the movement of corresponding image components between said first image frame and second first image frame.

32. The method according to claim 23, wherein said step of generating said image motion vector field further includes the step of excluding image gradients whose value is less than a threshold value, thereby eliminating those image gradients from any further processing.

33. The method according to claim 23, wherein said individual image component values, said image gradient values, and said residual error values are sub-sampled, thereby excluding all values that are not in the set of sub-sampled values.

34. The method according to claim 33, wherein the resolution of said sub-sampling may increase during the iterative process, whereby during early iterations less coefficients are used and less values are sampled, and during later iterations more coefficients are used and more values are sampled.

35. The method according to claim 23, further including the steps of:
   (a) partitioning said motion field into a plurality of smaller motion fields creating a plurality of separate reconstructed images; and
   (b) generating a composite reconstructed image by combining said separate reconstructed images;
thereby reducing the number of coefficients required to describe the motion field.

36. The method according to claim 35, wherein said separate reconstructed images may overlap.

37. The method according to claim 23, wherein said transform coefficient function may be one of the following:
   (a) a discrete cosine transform;
   (b) a discrete fourier transform;
   (c) a Haar transform;
   (d) a KL transform; and
   (e) a wavelet transform.

38. The method according to claim 23, wherein said step of estimating transform coefficients further includes the steps of:
   (a) calculating basis function values at fixed sampling points;
   (b) saving said saved basis function values in a lookup table; and
   (c) using said saved basis function values for transform coefficient estimates.

* * * * *